Dec. 13, 1966  F. E. HEIBERGER  3,292,004
SYSTEM FOR CONTROLLING THE OPERATING PERIOD
OF A RESPONSIVE DEVICE DURING EACH
CYCLE OF A PRESS OR THE LIKE
Filed May 31, 1963  4 Sheets-Sheet 2

Fig. 2

DEGREES OF ROTATION OF POTENTIOMETERS
P1 & P2 VS CALIBRATED SETTINGS OF
POTENTIOMETERS P3 & P4 (CALIBRATED
SETTINGS IN PARENTHESIS)

| SETTING OF POTENTIOMETER P4 (INITIATE OPERATION) | SETTING OF POTENTIOMETER P3 (COMPLETE OPERATION) | PERIOD OF CONTROL RELAY ENERGIZATION (SHADED) |
|---|---|---|

Fig. 3

Fig. 4
(INITIATE OPERATION)  (COMPLETE OPERATION)

Fig. 5
(COMPLETE OPERATION)  (INITIATE OPERATION)

INVENTOR.
FRANCIS E. HEIBERGER
BY
Wolfe, Hubbard, Voit & Osann
ATTYS.

Dec. 13, 1966 F. E. HEIBERGER 3,292,004
SYSTEM FOR CONTROLLING THE OPERATING PERIOD
OF A RESPONSIVE DEVICE DURING EACH
CYCLE OF A PRESS OR THE LIKE
Filed May 31, 1963 4 Sheets-Sheet 3

INVENTOR.
FRANCIS E. HEIBERGER
BY
Wolfe, Hubbard, Voit & Osann
ATTYS.

United States Patent Office 3,292,004
Patented Dec. 13, 1966

3,292,004
SYSTEM FOR CONTROLLING THE OPERATING PERIOD OF A RESPONSIVE DEVICE DURING EACH CYCLE OF A PRESS OR THE LIKE
Francis E. Heiberger, Elmhurst, Ill., assignor to Danly Machine Specialties, Inc., Chicago, Ill., a corporation of Illinois
Filed May 31, 1963, Ser. No. 284,715
17 Claims. (Cl. 307—88.5)

The present invention relates to a control system for controlling the periods of operation of at least one responsive device and more specifically to a control system for controlling the periods of energization and deenergization of at least one responsive device during each cycle of operation of a press or the like.

A primary object of this invention is to provide an improved control system which rapidly and accurately responds to positions of a driven element of a press or the like for accurately controlling the periods of operation and inoperation of at least one responsive device during each cycle of operation. An associated object is to provide an improved control system of this type for accurately controlling the periods of operation and inoperation of a plurality of responsive devices during each cycle of operation. In this connection, another object is to provide a control system responsive to positions of a driven element having a high level of resolution and discernment and capable of operation at speeds in excess of 30 r.p.m. which is beyond the capability of conventional, cam driven limit switch control arrangements. A further object of this invention is to provide a control system of this type wherein a short period of operation, on the order of 6° or less out of a 360° sweep cycle, may be defined even at speeds in excess of 30 r.p.m.

Another object of this invention is to provide a remote control system which overcomes the shortcomings of conventional, cam-driven limit switch control arrangements for presses or the like. Accordingly, an object is to provide a remote control system which is free of wear, capable of operating almost "indefinitely" and has a high degree of stability so that the period of operation is maintained precisely constant over many thousands of operations; in short, the system has excellent "repeatability." Along these lines, an object of this invention is to provide a remote control system which does not require constant care or attention so that maintenance is reduced to a minimum.

A further object of this invention is to provide a remote control system which is accurate and flexible and which may easily be preset to control the operation of any auxiliary device or circuit. An allied object of this invention is to provide a control system of this type capable of controlling the operation of a plurality of auxiliary devices or circuits.

Still another object of this invention is to provide a system of this type which includes means for preventing operation due to spurious signals.

An additional object of this invention is to provide a remote control system for presses or the like which may be quickly and readily installed. Accordingly, another object of this invention is to provide a remote control system which may be added to presently operating presses at low cost.

A more specific object of this invention is to provide a remote control system including a pair of bridge networks for controlling the periods of operation and inoperation of a responsive device chracterized in that the operation of the responsive device is not dependent upon the dropout characteristics of a controlling device, but rather is dependent upon reversing polarity outputs provided by the bridge circuits. A related object of this invention is to provide a control system of this type wherein a static-latching switch responds to the reversing polarity output of one bridge circuit for rendering the responsive device operative and wherein a second static-latching switch is provided which responds to a subsequent reversing polarity output of the other bridge circuit for rendering the responsive device inoperative. Another related object of this invention is to provide a remote control system of this type including a pair of composite bridge networks for controlling the periods of operation and inoperation of a plurality of responsive devices.

Other objects and advantages of this invention will become apparent upon reading the attached detailed description and upon reference to the drawings, in which.

While the invention has been described in connection with certain preferred embodiments, it is to be understood that the invention is not to be limited to the disclosed embodiments but, on the contrary, the invention is intended to cover the various modifications and equivalent arrangements included within the spirit and scope of the appended claims. The invention will be set forth as utilized in conjunction with the operation of a power press or the like, though it is not intended to be limited to such use.

Figure 1:
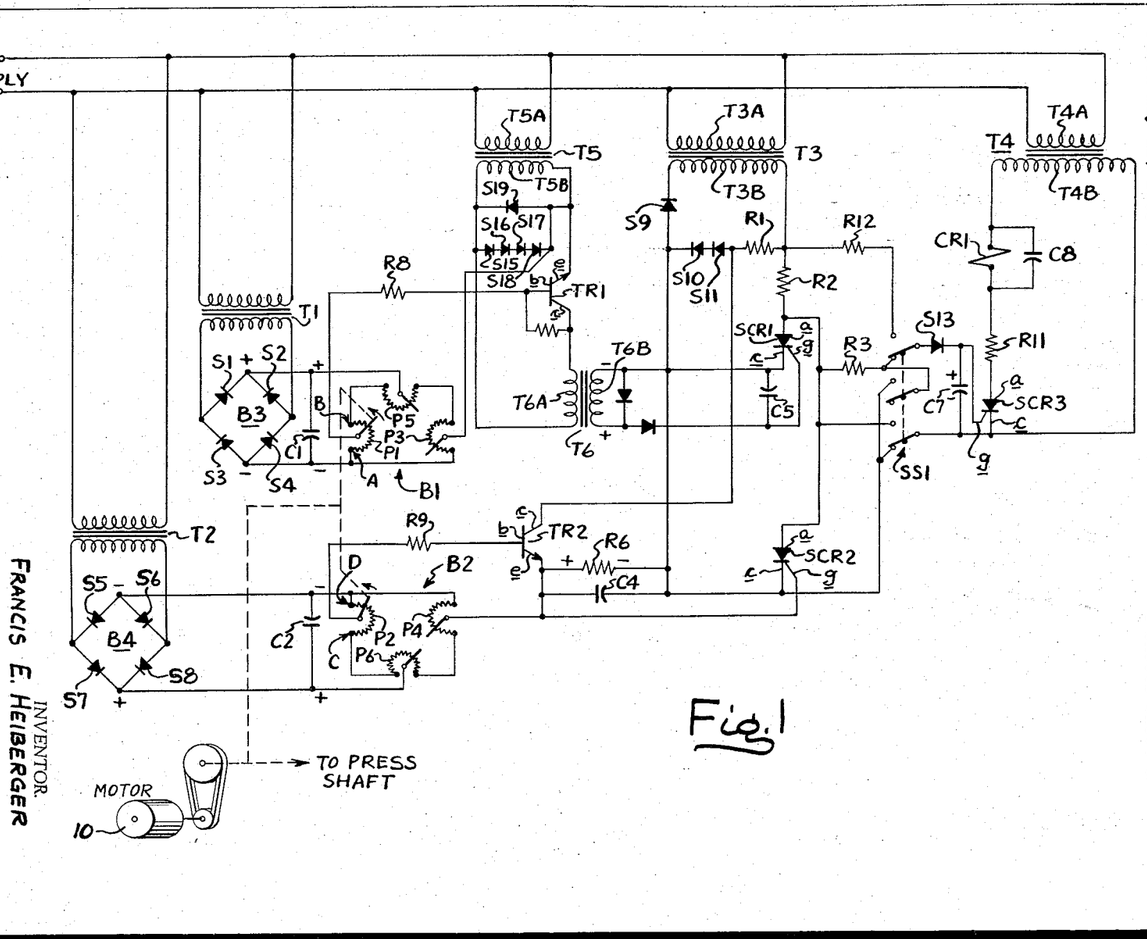
FIGURE 1 is a detailed schematic circuit diagram of a first embodiment of a remote control system constructed in accordance with the present invention.

Referring to FIG. 1, a motor 10 is provided for driving a power press or the like (not shown), the press drive shaft being connected to the motor through any suitable driving means common in the art. In many such press operations, it is desirable to control a remote operation in response to each cycle of operation of the press. For example, it may be desirable to position a safety shield during a prescribed portion of each cycle of operation to protect the press operator. Accordingly, a responsive device, such as a control relay CR1, is provided for controlling a desired remote operation. Alternatively, the apparatus to be described may be used to actuate control circuitry associated with the press or press driving motor in lieu of cam type limit switches usually employed. For example, the control system may control the operation of a valve in a compressed air or hydraulic system which in turn controls the operation of a work positioning apparatus or the like.

In accordance with the present invention, a control system is provided for controlling the time periods of operation and nonoperation of a responsive device during each cycle of operation of the press. More specifically, a remote control system is provided including a pair of bridge networks for providing reversing polarity voltage signals at preset times during each cycle of operation of the press, the reversing polarity signals being utilized to control the operation of a pair of static-latching switches characterized in that one static-latching switch controls the operation of the responsive device and the other static-latching switch controls the nonoperation of the responsive device.

In accordance with one of the features of the control system, a pair of control bridge networks B1 and B2 are provided for producing reversing polarity output voltage signals during each cycle of operation of the press. The bridge network outputs are utilized to control the operation of the responsive device or control relay CR1. As will become apparent later, the control relay is energized as the output of bridge network B2 is reversing from positive to negative polarity, when the output drops below a prescribed positive voltage level, and is deenergized as the output of bridge network B1 is reversing from negative to positive polarity, when the output attains a prescribed positive voltage level. Accordingly, for the control relay to be energized during a prescribed portion of a press cycle, the bridge network B2 operates, as described, at a set time in the cycle and, subsequently, the bridge network B1 operates, as described, at a set time in the cycle.

Bridge networks B1 and B2 respectively include pairs of circular potentiometers P1 and P3 and P2 and P4, the potentiometers in each bridge network having their resistive windings connected in parallel so as to form a closed loop. Inputs for the bridge networks B1 and B2 are provided between the common terminals of the resistive windings of the potentiometers therein and outputs therefor are provided between the contact arms of the potentiometers.

Figure 2:
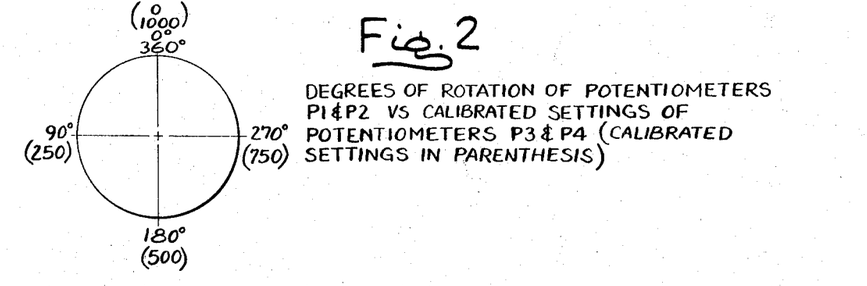
FIG. 2 illustrates the relationship between each revolution of a driven member of a press or the like which controls operation of the remote control system in FIG. 1 and the calibrated settings of adjustable reference potentiometers in the remote control system.

Potentiometers P1 and P2, which are rotatable control potentiometers, are concentrically related and the contact arms thereof are driven from the drive shaft of the press through suitable driving means, illustrated by dotted lines in FIG. 1, such that one revolution thereof coincides with one cycle of operation of the press. The potentiometer contact arms are driven in the counterclockwise direction in the illustrated embodiment. Preferably, the control potentiometers P1 and P2 are of the single revolution, conductive plastic or film type capable of a conservative ten-million operations with a potential life of up to one-hundred million operations and with a dead band or open space of approximately 5°, the dead band portions of the potentiometers being aligned. Suitable conductive plastic type potentiometers are manufactured by Markite under Model Number 3633 and suitable film type potentiometers are manufactured by Computer Instrument Corporation under "Supercon" Model Number 505. Potentiometers P3 and P4, which are manually preset reference potentiometers, may be multiturn potentiometers having indicating dials calibrated, for example, to one-one thousandth of the total contact arm or slider travel or may be single-turn potentiometers having indicating dials calibrated in degrees. The relationship between the degree settings and the calibrated one-thousand settings is illustrated in FIG. 2.

Bridge network B1 is powered by a transformer T1 through a full wave rectifying bridge network B3 consisting of diodes S1–S4 and a filtering capacitor C1 so that an input voltage is applied to the bridge network B1 having a plus-to-minus relationship, as designated. Likewise, bridge network B2 is powered by a transformer T2 through a full wave rectifier bridge network B4 consisting of diodes S5–S8 and a filtering capacitor C2 so that an input voltage is applied to the bridge network B2 having a plus-to-minus relationship, as designated. In turn, the transformers T1 and T2 are powered by an A.-C. supply.

The contact arms of the reference potentiometers P3 and P4 are preset at desired settings so that, as the contact arms of the control potentiometers P1 and P2 are driven or "swept" through each revolution, a point is reached whereat the desired positive potential output is provided at the output of the associated bridge network B1 or B2. A prescribed relationship exists between the contact positions of the contact arms of the control potentiometers and the indicating dial settings of the reference potentiometers so that the desired positive output is provided at the angle in a sweep corresponding to the indicating dial setting. In actual practice such a prescribed relationship may be provided by offsetting the indicating dial settings with respect to the control potentiometer contact positions or by connecting compensating resistors in series with the brige legs formed by the reference potentiometers which, in effect, offset the indicating dial settings. Without such compensation, a "null" or zero output would be provided at the preset angles of the reference potentiometers. Accordingly, the contact arms of the reference potentiometers P3 and P4 may be preset with a prescribed angular relationship therebetween so that the desired positive potential outputs are attained at different times during each concurrent sweep of the contact arms of the control potentiometers P1 and P2. Additionally, the contact arms of the control potentiometers are preferably arranged to have a constant displaced angular relationship therebetween so that, when one contact arm is in the dead band or open region of the resistive winding, the other contact arm is in engagement with the associated resistive winding. In the illustrated embodiment, the relationship is preferably such that the contact arm of potentiometer P2 engages terminal C when the contact arm of potentiometer P1 engages terminal B, each of these terminals corresponding to both the 0° and 360° points in the sweep of the associated contact arm.

A brief description of the operation of one of the bridge circuits may be helpful in understanding the operation of the remote control system. Assume that initially the reference potentiometer P3 in bridge network B1 is preset at a resistive winding setting corresponding to 180°. When the contact arm of the control potentiometer P1 engages terminal A of the resistive winding, the bridge network B1 is unbalanced. Due to the input voltage polarity, the potential at the control potentiometer contact arm is negative with respect to the potential at the contact arm of the preset potentiometer P3. Subsequently, when the contact arm of the control potentiometer has been driven to the 180° position, the desired positive potential output will be provided, i.e. the contact arm thereof will be sufficiently positive with respect to the contact arm of the reference potentiometer. Finally, when the contact arm of the control potentiometer has been driven past the 180° point, the potential at the contact arm thereof will be even more positive with respect to the potential at the contact arm of the reference potentiometer. Thus, during each cycle of operation of the press, the output of the bridge network B1 is swept from a negative potential to a positive potential, i.e. the potential at the contact arm of the control potentiometer P1 with respect to the potential at the contact arm of the reference potentiometer P3 is swept from a negative relative value to a positive relative value. Accordingly, the desired positive output is provided at a desired angular position during each sweep of the control potentiometer.

Likewise, the output of the bridge circuit B2 will also be swept from a potential of one polarity to a potential of the opposite polarity. However, because the input voltage to bridge network B2 is of opposite polarity, the output of bridge network B2 will be swept from a positive potential to a negative potential, i.e. the potential at the contact arm of the control potentiometer P2 with respect to the potential at the contact arm of the reference potentiometer P4 will be swept from a relative positive value to a relative negative value during each cycle of the press. As with bridge network B1, the angular position of the contact arm for the control potentiometer at which the desired positive potential output is provided is dependent upon the presetting of the reference potentiometer.

For the purpose of compensating for resistive tolerance variations between the potentiometers in the bridge networks B1 and B2, balancing potentiometers may be provided. In the illustrated embodiment, balancing potentiometers P5 and P6 are respectively provided in the bridge networks B1 and B2. The balancing potentiometers may be similar to the reference potentiometers, but need not be of such high quality.

In accordance with another feature of the control system a pair of static-latching switches SCR1 and SCR2 are provided for controlling the operation of the control relay CR1 in response to the reversing polarity outputs of the bridge networks B1 and B2. The static-latching switches are illustrated as silicon controlled rectifiers having anodes, cathodes and gate electrodes respectively designated as $a$, $c$ and $g$. When the output of the bridge network B1 attains the prescribed positive value, the silicon controlled rectifier SCR1 is rendered conductive and, likewise, when the output of the bridge network B2 attains the prescribed positive value, the silicon controlled rectifier SCR2 is rendered conductive. Conversely, the rectifiers SCR1 and SCR2 are rendered nonconductive when the bridge outputs are below these positive values.

The silicon controlled rectifiers SCR1 and SCR2 control the operation of the control relay CR1 by controlling the operation of a third static-latching switch SCR3, also illustrated as a silicon controlled rectifier. The rectifier SCR3 has its anode-cathode circuit connected in series with the control relay so that, when the rectifier is rendered conductive, the control relay is energized. As may be seen, the rectifiers SCR1 and SCR2 are so related to the gate electrode-cathode circuit of rectifier SCR3 that the gate electrode is clamped or shorted to the cathode when either of the rectifiers SCR1 or SCR2 is conductive. As is well known in the art, a silicon controlled rectifier is "conditioned" for conduction when the gate electrode is driven positive with respect to the cathode, i.e. a triggering current signal is applied to the gate electrode, so that, if the anode is concurrently driven positive with respect to the cathode, the silicon controlled rectifier conducts, such conduction continuing as long as the current flow therethrough exceeds a cut-off level. Accordingly, when the gate electrode of the silicon controlled rectifier SCR3 is clamped or shorted to the cathode thereof due to conduction of one of the rectifiers SCR1 or SCR2, the rectifier SCR3 is not conditioned for conduction, but rather is conditioned not to conduct. It follows then that, if the outputs of the bridge networks B1 and B2 are below the required positive value, i.e. are below the "triggering" level, the rectifiers SCR1 and SCR2 are nonconductive so that the rectifier SCR3 may be rendered conductive.

The anode-cathode circuits of the rectifiers SCR1 and SCR2 and the gate electrode-cathode circuit of the rectifier SCR3 are powered by a transformer T3 which in turn is powered by the A.C. supply, the output of the transformer being half wave rectified as will be apparent later. Consequently, when the output of one of the bridge networks B1 or B2 is sufficiently positive and is at the "triggering" level, the gate electrode of the associated rectifier SCR1 or SCR2 is driven sufficiently positive with respect to the cathode so that a "triggering" current signal is applied to the gate electrode. The rectifier is thus conditioned for conduction and is rendered conductive when the right-hand terminal of the secondary winding T3B of the transformer T3 goes positive with respect to the left-hand terminal thereof. It follows then that the gate electrode of the rectifier SCR3 is clamped to the cathode so that conduction thereof is prohibited.

However, if the outputs of both the bridge networks B1 and B2 are below the "triggering" level, the rectifiers SCR1 and SCR2 are nonconductive so that the gate electrode of the rectifier SCR3 is driven positive with respect to the cathode and a "triggering" current signal is applied to the gate electrode as the right-hand terminal of the secondary winding T3B goes positive with respect to the left-hand terminal. Accordingly, the rectifier SCR3 is conditioned for conduction. For the purpose of sustaining the rectifier SCR3 in the "conditioned for conduction" state when the right-hand terminal of winding T3B is subsequently driven negative with respect to the left-hand terminal, a capacitor C7 is interposed between the gate electrode and the cathode. This capacitor also performs the function of suppressing transients.

The anode-cathode circuit of the rectifier SCR3 is powered by a transformer T4 which is also powered by the A.-C. supply. Thus, it may be seen that when the rectifier SCR3 has been conditioned for conduction and the left-hand terminal of the transformer secondary winding T4B goes positive with respect to the right-hand terminal, the rectifier is rendered conductive. Since the control relay CR1 is connected in series with the anode-cathode circuit of the rectifier, it follows that the control relay is energized. A filtering capacitor C8 is connected across the control relay to sustain it in the energized condition during the subsequent half cycles of the A.-C. supply when the rectifier SCR3 is conditioned for conduction and the left-hand terminal of winding T4B is negative with respect to the right-hand terminal. Additionally, a resistor R11 is connected in series with the control relay to limit the current flow therethrough.

The power supplied to the gate electrode-cathode circuit of the rectifier SCR3 by the transformer T3 is half wave rectified due to the presence of diodes S9 and S13, the diode S9 also half wave rectifying the power supplied to the anode-cathode circuits of rectifiers SCR1 and SCR2. Additionally, current limiting resistors R2 and R3 are provided for limiting the current flow in the gate electrode-cathode circuit of rectifier SCR3 and for determining the charging time of the capacitor C7, the current limiting resistor R2 also limiting current flow through rectifiers SCR1 and SCR2.

In view of the foregoing, it may be seen that, if the bridge networks B1 and B2 are controlled to provide simultaneous negative outputs during a preselected portion of each cycle of operation, control relay CR1 may be energized during this time period.

For the purpose of controlling the operations of the rectifiers SCR1 and SCR2 in response to the outputs of the bridge networks B1 and B2, a pair of transistors TR1 and TR2 are provided which are respectively interposed therebetween. The transistors are of the NPN type having a base, a collector and an emitter respectively designated as $b$, $c$ and $e$.

The base of transistor TR1 is connected to the contact arm of the control potentiometer P1 through a current limiting resistor R8 and the emitter thereof is connected directly to the contact arm of the reference potentiometer P3 and to one terminal of the secondary winding T5B of a power supplying transformer T5 which is also powered by the A.-C. supply. The collector of transistor TR1 is connected to the other terminal of the secondary winding T5B through the primary winding T6A of a control transformer T6. As long as the contact arm of the control potentiometer is not sufficiently positive with respect to the contact arm of the reference potentiometer, the transistor TR1 is nonconductive and the passage of current therethrough to energize the primary of transformer T6 is prohibited. A diode S19 is connected directly across the secondary winding T5B to conduct current when transistor TR1 is nonconductive and a series of diodes S15–S18 are also connected directly across the transformer T5 to permit conduction simultaneously with conduction through the transistor TR1.

It follows then that, when the contact arm of the control potentiometer P1 goes sufficiently positive with respect to the contact arm of the reference potentiometer P3 and the left-hand terminal of the secondary winding T5B is positive with respect to the right-hand terminal, transistor TR1 is rendered conductive so that current is permitted to pass through the collector-emitter circuit and the primary winding T6A is energized inducing a triggering voltage in the secondary winding T6B which has a polarity as designated. Since the transistor TR1 and the series of diodes S15–S18 conduct simultaneously, the voltage drop across diodes S15–S18 regulates the power applied to the primary winding T6A and thus regulates the output at the secondary winding T6B.

The gate electrode-cathode circuit of the silicon controlled rectifier SCR1 is connected across the secondary winding T6B so that, when a triggering voltage is induced in the secondary winding T6B, the silicon controlled rectifier is conditioned for conduction. A capacitor C5 is connected between the gate electrode and the cathode of rectifier SCR1 to sustain, for a short time, the rectifier in condition for conduction when the A.-C. supply has reversed polarity, the transistor TR1 being rendered nonconductive as the A.-C. supply reverses polarity so that the triggering voltage is no longer provided across the winding T6B. Subsequently, when the right-hand terminal of the secondary winding T3B of transformer T3 goes positive with respect to the left-hand terminal, the rectifier SCR1 is rendered conductive. It follows that, when the contact arm of the control potentiometer P1 goes sufficiently positive with respect to the contact arm of the reference potentiometer P3, transistor TR1 is rendered conductive and the silicon controlled rectifier SCR1 is rendered conductive causing the gate electrode of the silicon controlled rectifier SCR3 to be clamped to the cathode thereof so that the rectifier SCR3 is conditioned not to conduct and the control relay CR1 can not be energized.

As set forth previously, the angle in the sweep of the contact arm of the control potentiometer P1 at which the contact arm goes sufficiently positive with respect to the contact arm of the reference potentiometer P3 is dependent upon the presetting of the contact arm of the reference potentiometer. Therefore, the time in the sweep at which energization of the control relay CR1 is prohibited due to conduction of the silicon controlled rectifier SCR1 may be regulated by varying the setting of the contact arm of the reference potentiometer.

The transformer T6 has been interposed between the transistor TR1 and the silicon controlled rectifier SCR1 to isolate the bridge networks B1 and B2 so as to eliminate the high resistive D.-C. path therebetween, it having been found that a more reliable controlling operation is provided when such isolation is provided. In some instances such isolation may not be required. Accordingly, the invention is not intended to be limited to the cases wherein such isolation is required, but rather is also intended to cover such applications wherein direct coupling is provided between the transistor TR1 and the silicon controlled rectifier SCR1.

The base of transistor TR2 is connected to the contact arm of the control potentiometer P2 through a current limiting resistor R9. The emitter thereof is connected directly to the contact arm of the reference potentiometer P4, to the gate electrode of the silicon controlled rectifier SCR2, and to one terminal of the secondary winding T3B of the transformer T3 through the parallel arrangement of a resistor R6 and a filtering capacitor C4 and through the previously-mentioned diode S9. The collector of transistor TR2 is connected to the same terminal of the secondary winding T3B through diodes S10 and S11 as well as through the diode S9 and is connected to the other terminal of the secondary winding T3B through a resistor R1. As may be seen, the gate electrode-cathode circuit of rectifier SCR2 is connected in parallel with the parallel arrangement of the resistor R6 and the capacitor C4. Accordingly, when the transistor TR2 is conductive, current flowing through the transistor TR2 flows through the resistor R6 causing a triggering voltage to be developed thereacross so that rectifier SCR2 is thereby conditioned for or "triggered to" conduction.

The voltage that may be developed across the resistor R6 and, thus, the triggering voltage that may be applied to the silicon controlled rectifier SCR2 is limited by the forward voltage drop across diodes S10 and S11 since these diodes are connected across the series arrangement of the transistor TR2 and the resistor R6 and since these diodes conduct simultaneously with the transistor TR2. Transistor TR2 is conductive when the base is sufficiently positive with respect to the emitter and the right-hand terminal of the secondary winding T3B is positive with respect to the left-hand terminal thereof. Likewise, if the silicon controlled rectifier SCR2 is conditioned for conduction, it is conductive when the right-hand terminal of the secondary winding T3B is positive with respect to the left-hand terminal.

Accordingly, it follows that as long as the contact arm of the control potentiometer P2 is sufficiently positive with respect to the contact arm of the reference potentiometer P4, the base of transistor TR2 is maintained sufficiently positive with respect to the emitter thereof so that transistor TR2 is conductive and the silicon controlled rectifier SCR2 is conductive. Under these conditions, the rectifier SCR3 is conditioned not to conduct, as set forth above, so that the control relay CR1 may not be energized. Subsequently in the cycle of operation, when the contact arm of the control potentiometer P2 is not sufficiently positive with respect to the contact arm of the reference potentiometer P4, transistor TR2 is rendered nonconductive so that the silicon controlled rectifier SCR2 is rendered nonconductive. As mentioned above, when rectifier SCR2 is rendered nonconductive, the gate electrode rectifier SCR3 is not shorted to the cathode thereof. Thus, the gate electrode is driven positive with respect to the cathode, when the right-hand terminal of winding T3B goes positive with respect to the left-hand terminal, so that rectifier SCR3 is conditioned for conduction. Subsequently, when the left-hand terminal of the secondary winding T4B goes positive with respect to the right-hand terminal, the rectifier SCR3 is rendered conductive and the control relay is energized.

As previously set forth, the angle in the sweep of the contact arms of the control potentiometer P2 at which the contact arm is not sufficiently positive with respect to the contact arm of the reference potentiometer P4 to maintain transistor TR2 conductive is dependent upon the presetting of the contact arm of the reference poteniometer. Therefore, the time during the sweep at which energization of the control relay is no longer prohibited due to conduction of the rectifier SCR2 may be regulated by varying the setting of the contact arm of the reference potentiometer.

It is evident then that, if the reference potentiometers P3 and P4 are so preset that the output of bridge network B2 is driven below the triggering voltage level before the output of bridge network B1 is driven to the triggering voltage level, both rectifiers SCR1 and SCR2 are nonconductive during the time therebetween so that rectifier SCR3 is rendered conductive and the control relay CR1 is energized. Accordingly, the reference potentiometers may be preset so that the rectifier SCR3 may be rendered conductive and the control relay may be energized during a prescribed portion of the sweep of the contact arms of the control potentiometers, each sweep corresponding with one cycle of operation of the press.

It should be noted that the gate electrode-cathode circuits of the silicon controlled rectifiers SCR1 and SCR2 may be connected directly across the outputs of the bridge networks B1 and B2. However, in the illustrated embodiment, transistors TR1 and TR2 have been interposed therebetween to function as desired preamplifiers and to provide a high input impedance which allows for little loading, whereas the silicon controlled rectifiers would provide a low input impedance so that high loading would result. Accordingly, the invention is not intended to be limited to the inclusion of these transistors.

Figure 3:
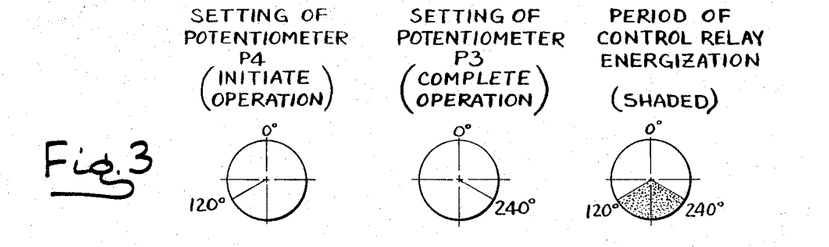
FIG. 3 illustrates a first relationship between the presetting of the adjustable reference potentiometers in the remote control system of FIG. 1 and the period of operation of an electrical responsive device controlled by the remote control system.

To aid in better understanding the invention, a brief description of the overall operation thereof may be helpful. For a first example, let it be assumed that the reference potentiometers are preset as illustrated in FIG. 3 so that the reference potentiometer P4 is preset to a setting of approximately 120° and the reference potentiometer P3 is preset to a setting of approximately 240°. Further, let it be assumed that, at the beginning of an operation, the contact arm of the control potentiometer P2 is in engagement with point C which corresponds with the beginning of the resistive winding portion thereof and the contact arm of the control potentiometer P1 is in engagement with point B which corresponds with the end of the resistive winding portion thereof. Accordingly, as may be seen by reference to FIG. 6, the outputs of the bridge network B1 and B2 are initially positive, i.e., are positive at 0° in the sweep, so that the transistors TR1 and TR2 and the rectifiers SCR1 and SCR2 are conductive if the right-hand terminal of the secondary winding T3B is positive with respect to the left-hand terminal thereof.

Figure 6:
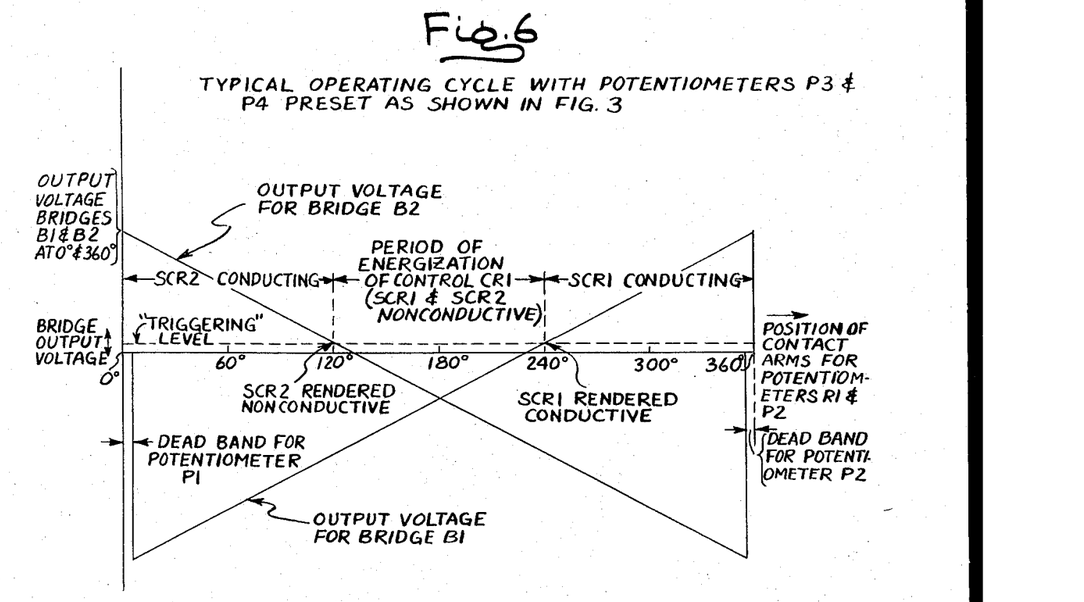
FIG. 6 illustrates a typical operating cycle of the control system illustrated in FIG. 1.

As the operation is begun and movement is imparted to the contact arms of the control potentiometers, the contact arm of the potentiometer P1 moves into the dead band so that the output potential of the bridge network B1 drops to zero and the contact arm of the potentiometer P2 moves along the resistive winding so that the output potential of the bridge network B2 begins to decrease (see FIG. 6). When the contact arm of the potentiometer P1 is driven through the dead band to terminal A on the resistive winding thereof, the output potential of the bridge network B1 drops to a negative value as illustrated. Since the output of bridge network B2 is above the triggering level during this time, the rectifier SCR2 is maintained conductive or is rendered conductive and the gate electrode of the rectifier SCR3 is shorted to the cathode so that triggering thereof is prohibited.

When the contact arms of the control potentiometer have been swept through approximately 120° of the revolutions thereof, the output of the bridge network B2 is driven to a potential such that the transistor TR2 and the rectifier SCR2 are rendered nonconductive (see 120° point in FIG. 6). Subsequently, as the sweep increases beyond the 120° point, the potential at the contact arm of the control potentiometer P2 goes negative with respect to the potential at the contact arm of the reference potentiometer P4 so that the transistor TR2 and the rectifier SCR2 are maintained nonconductive throughout the remainder of the cycle of operation of the press. Accordingly, at approximately the 120° point in the sweep, the secondary output of the transformer T3 is applied between the gate electrode and the cathode of the rectifier SCR3 and, when the right-hand terminal of the secondary winding is positive with respect to the left-hand terminal, the rectifier is conditioned for conduction. The capacitor C7 causes a voltage to be sustained between the gate electrode and the cathode as long as both of the silicon controlled rectifiers SCR1 and SCR2 remain nonconductive. Subsequently, when the left-hand terminal of the secondary winding T4B goes positive with respect to the right-hand terminal thereof, the silicon controlled rectifier SCR3 is rendered conductive so that the control relay CR1 is energized. As previously pointed out, the control relay remains energized as long as both the rectifiers SCR1 and SCR2 are nonconductive.

When the contact arms of the control potentiometers are swept through the 240° point, the output of the bridge network B1 is driven to a sufficiently positive potential so that transistor TR1 and the rectifier SCR1 are rendered conductive (see 240° point in FIG. 6). As may be seen, the rectifier SCR1 remains conductive through to the 360° point in the sweep. It follows then that the gate electrode of the silicon controlled rectifier SCR3 is shorted to the cathode, due to conduction of rectifier SCR1, so that further energization of the control relay CR1 is prohibited.

In view of the foregoing, it follows that the control relay is energized from the time the contact arms of control potentiometers reach the 120° point in the sweep until they reach the 240° point, this period of operation being illustrated in FIG. 3 by the shaded portion of the period of control relay energization circle. Thus, since each sweep of the contact arms of the control potentiometers corresponds to a cycle of operation of the press, the control relay is energized during this desired portion of the cycle of operation to control a desired responsive device.

Figure 4:
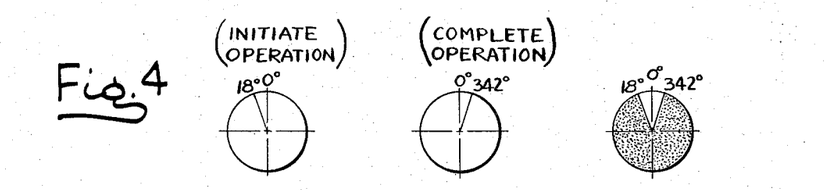
FIG. 4 illustrates a second relationship between the presetting of the adjustable reference potentiometers in the remote control system of FIG. 1 and the period of operation of an electrical responsive device controlled by the remote control system.

Referring to FIG. 4, presettings of the reference potentiometers are illustrated for a condition wherein it is desired for the control relay to be energized from the time the contact arms of the control potentiometers have reached the 18° point in their sweep until they have reached the 342° point. The operation with these presettings will be similar to the operation with the presettings illustrated in FIG. 3 and, therefore, the operation will not be set forth herein. Suffice it to say that the control relay is energized during the time period of a sweep as illustrated in FIG. 4 by the shaded portion of the period of control relay energization circle.

For the purpose of reversing the effect of the rectifiers SCR1 and SCR2, a selector switch SS1 has been provided which is interposed between the rectifier SCR3 and the transformer T3. With the selector switch in the position illustrated in FIG. 1, the remote control system operates as set forth hereinabove. However, when the selector switch SS1 is manually switched to its other condition, the rectifiers SCR1 and SCR2 are no longer connected directly across the gate electrode-cathode circuit of the rectifier SCR3, but rather are connected in series with the transformer secondary and the gate electrode-cathode circuit, the silicon controlled rectifiers SCR1 and SCR2 being connected in parallel. Accordingly, it follows that the rectifier SCR3 may be "conditioned for" or "triggered to" conduction as long as one of the rectifiers SCR1 and SCR2 is conducting and that, when both the rectifiers SCR1 and SCR2 are nonconducting, the rectifier SCR3 is conditioned not to conduct.

At the beginning of an operation, when the rectifier SCR2 is conducting, the rectifier SCR3 is conditioned for conduction so that the control relay CR1 is energized as the left-hand terminal of the secondary winding T4B goes positive with respect to the right-hand terminal. When the rectifier SCR2 is rendered nonconductive in response to the dropping potential at the output of the bridge network B2, the rectifier SCR3 is conditioned not to conduct so that the control relay is no longer energized. Subsequently, when the polarity of the output of the bridge network B1 attains sufficient potential so that the rectifier SCR1 is rendered conductive, the rectifier SCR3 is again conditioned for conduction so that the control relay is again energized as the left-hand terminal of the secondary winding T4B goes positive with respect to the right-hand terminal.

Figure 5:
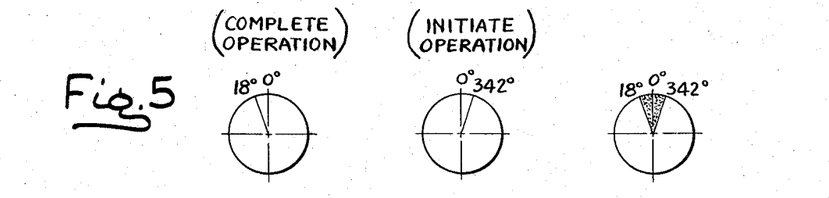
FIG. 5 illustrates a third relationship between the presetting of the adjustable reference potentiometers in the remote control system of FIG. 1 and the period of operation of an electrical responsive device controlled by the remote control system.

Such operation may be more readily seen by reference to FIG. 5 wherein presettings of the reference potentiometers P4 and P3 correspond to those illustrated in FIG. 4. Briefly speaking, the control relay is energized during the time that the contact arms of control potentiometers P1 and P2 are swept from 0° to 18° and, when the 18° point in the sweep is reached, the rectifier SCR2 is rendered nonconductive. As a result, the rectifier SCR3 is no longer conditioned for conduction and the control relay is deenergized. Subsequently, when the contact arms of control potentiometers have been swept through the 342° point, the output of the bridge network B1 attains sufficient potential so that the rectifier SCR1 is rendered conductive and the rectifier SCR3 is again conditioned for conduction. Accordingly, the control relay is energized during the time that the potentiometer contact arms are swept from 342° to 360°. The periods of energization of the control relay are illustrated in FIG. 5 by the shaded portion of the period of solenoid energization circle.

Figure 7:
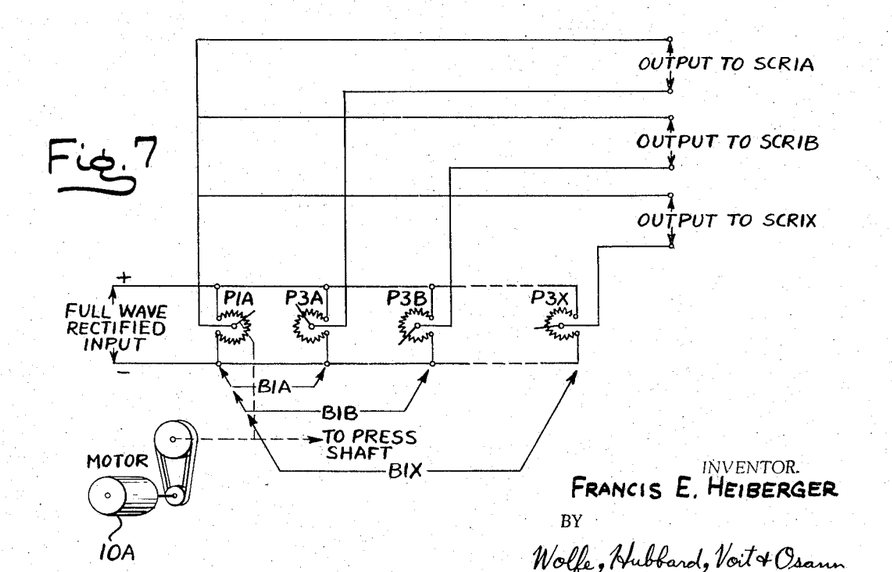
FIG. 7 illustrates a composite bridge network which may be substituted for the bridge networks illustrated in FIG. 1.

In accordance with another aspect of the present invention, the above-described remote control system may be modified so that a plurality of remote operations or devices may be controlled thereby. More specifically, composite bridge networks may be substituted for the above-described bridge networks B1 and B2 so that a plurality of bridge outputs are provided thereby which may be utilized to control a plurality of remote devices, such as control relays. Referring to FIG. 7, a composite bridge network is illustrated which may be substituted for each of the above-described bridge networks, the components therein being designated as corresponding to the components in bridge network B1.

The composite birdge network includes a rotatable control potentiometer P1A corresponding to the above-described control potentiometer P1 and includes a plurality of reference potentiometers P3A, P3B and P3X corresponding to the above-described reference potentiometer P3, the potentiometers being connected in parallel to form a plurality of bridge networks B1A, B1B and B1X. Though three reference potentiometers have been illustrated, it is to be understood that any desired number of reference potentiometers may be associated with the control potentiometer P1A.

Each of the bridge networks B1A, B1B and B1X will operate in like manner to the above-described bridge network B1. Accordingly, details of the operations thereof will not be set forth herein. Suffice it to say that the reference potentiometers P3A, P3B and P3X may be preset so that desired potential outputs may respectively be provided at outputs A, B and X at different desired times during each sweep of the contact arm of the control potentiometer P1A, each sweep thereof corresponding to a cycle of operation of the press or the like. The outputs provided at the outputs A, B and X may likewise be utilized to control the operations of static-latching switches or silicon controlled rectifiers SCR 1A, SCR 1B and SCR 1X which in turn may be utilized to control the operation of desired responsive devices.

In like manner, a composite bridge network, such as that illustrated in FIG. 7, may be substituted for the above-described bridge network B2 so that a second plurality of static-latching switches or silicon controlled rectifiers may be controlled thereby. Accordingly, it follows that, if composite bridge networks such as that illustrated in FIG. 7 are substituted for the bridge networks B1 and B2, a plurality of remote responsive devices may be controlled thereby characterized in that the periods of operation and nonoperation of the responsive devices may occur at different times during each cycle of operation of the press.

Figure 8:
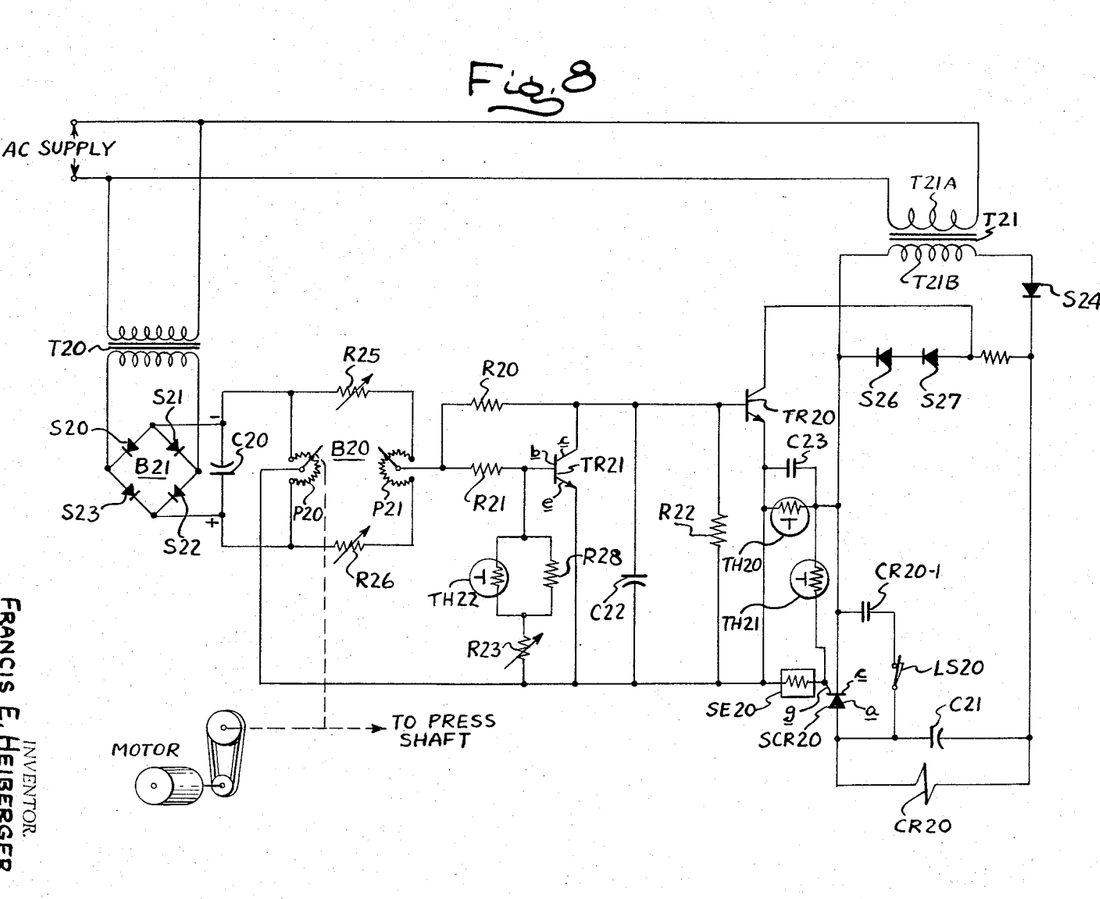
FIG. 8 is a detailed schematic diagram of a second embodiment of a remote control system constructed in accordance with the present invention.

Further in accordance with the teachings of the present invention, a second embodiment of a remote control system is provided for controlling the time periods of operation and nonoperation of a responsive device during each cycle of operation of a press or the like. More specifically, a remote control system is provided including a single bridge network for producing a plurality of outputs which may be utilized to control the operation of at least one remote responsive device, such as a control relay. Referring to FIG. 8, a remote control system is illustrated which functions similar to the previously-described control system in FIG. 1, but includes a single composite bridge network rather than a pair of bridge networks.

For the purpose of providing a reversing polarity output voltage signal during each cycle of operation of the press, a control bridge network B20 is provided. The output of the bridge network B20 is utilized to cause a static-latching switch SCR20, illustrated as a silicon controlled rectifier, to be rendered operative and nonoperative at prescribed times during each cycle of operation of the press. The bridge network B20 is similar to the previously-described bridge network B1 and, thus, includes a circular control potentiometer P20 and a circular reference potentiometer P21, the contact arm of the control potentiometer being driven through one revolution for each cycle of operation of the press. Accordingly, a reversing polarity output is provided by the bridge network B20 which, as illustrated, is swept from a negative value to a positive value at a time in the sweep of the contact arm of the control potentiometer determined by the presetting of the contact arm of the reference potentiometer. Preferably, the potentiometers are the same type as those set forth above with respect to FIG. 1.

The bridge network B20 is powered by a transformer T20 through a full wave rectifying bridge network B21 consisting of diodes S20–S23 and a filtering capacitor C20 so that an input voltage is applied to the bridge network having a plus-to-minus relationship as designated. The transformer T20 is in turn powered by an A.C. supply.

In response to a prescribed potential, positive output voltage signal being provided by the bridge network B20, i.e., when the contact arm of the reference potentiometer P21 is sufficiently positive with respect to the contact arm of the control potentiometer P20, means are rendered operable for causing the silicon controlled rectifier SCR20 to be conditioned for conduction. Subsequently, when the anode of the rectifier is driven positive with respect to the cathode, the rectifier conducts so that a responsive device CR20, such as a control relay, may be rendered operative or energized, the control relay being connected in series with the rectifier anode-cathode circuit. The control relay and the anode-cathode of the rectifier are powered by a transformer T21 which is also powered by the A.C. supply, the output of the transformer being half wave rectified due to the presence of diode S24. A filtering capacitor C21 is connected across the control relay for maintaining it conductive during alternative half cycles of the A.C. supply when the rectifier SCR20 is conditioned for conduction.

Subsequently, when the output of the bridge network B20 attains a greater prescribed potential, positive voltage level, means are rendered operable for causing the rectifier SCR20 to be rendered inoperative. As will become apparent later, the gate electrode-cathode circuit of the rectifier SCR20 is shorted out at this time.

A transistor TR20 is provided for conditioning the rectifier SCR20 for conduction when the output of the bridge network B20 has attained a sufficiently positive potential. The base of the transistor is connected to the contact arm of the reference potentiometer P21 through a current limiting resistor R20 and the emitter thereof is connected to the contact arm of the control potentiometer P20. A resistor R22 is connected between the base and the emitter so that resistors R20 and R22 function as a voltage divider and the base to emitter potential is determined by the drop across resistor R22. Additionally, a filtering capacitor C22 is connected between the base and the emitter for shorting out transient signals. It follows then that, when the potential at the contact arm of the reference potentiometer is sufficiently positive with respect to the potential at the contact arm of the control potentiometer, the drop across resistor R22 is sufficient to cause transistor TR20 to be rendered conductive as the right-hand side of the secondary winding T21B of the transformer T21 goes positive with respect to the left-hand terminal thereof. In response to the conduction of transistor TR20, a triggering signal is applied to the gate electrode of the rectifier SCR20 causing the rectifier to be rendered conductive so that the control relay CR20 is energized. A pair of diodes S26 and S27 are also conducting when the transistor TR20 is conducting so that the voltage developed between the gate electrode and the cathode of the rectifier 20 is determined by the drop thereacross.

For the purpose of subsequently causing the rectifier SCR20 to be rendered inoperative when the bridge output attains a prescribed greater positive level, a transistor TR21 is provided. The base of transistor TR21 is connected to the reference potentiometer contact arm through a current limiting resistor R21 and the emitter thereof is connected to the control potentiometer contact arm. A resistor R23 is connected between the base and the emitter so that resistors R21 and R23 function as a voltage divider and the base to emitter potential is determined by the drop across resistor R23. Resistor R23 may be variable so that the voltage dividing effect may be varied thereby and, thus, the time at which the rectifier SCR20 is rendered inoperative may be varied. When the output of bridge network B20 becomes sufficiently positive, a sufficient drop is developed across resistor R23 to cause transistor TR21 to be rendered conductive. In response to conduction of transistor TR21, the base-emitter circuit of transistor TR20 is short circuited so that subsequent conduction thereof is prohibited and the subsequent application of a triggering signal to rectifier SCR20 is also prohibited. Accordingly, rectifier SCR20 is rendered inoperative.

In order to more clearly understand this embodiment of the present invention, a brief description of the operation thereof may be helpful. At a prescribed time during each cycle of the press determined by the presetting of the contact arm of the reference potentiometer P21, the output of the bridge network B20 is driven sufficiently positive so that the transistor TR20 is rendered conductive. In response to conduction of the transistor TR20, a triggering signal is applied to the gate electrode of the rectifier SCR20 so that the rectifier is rendered conductive. The control relay CR20 is energized in response to conduction of the rectifier SCR20. Subsequently, the potential developed across the resistor R23 is such that the transistor TR21 is rendered conductive. In response to conduction of the transistor TR21, the base-emitter circuit of transistor TR20 is shorted so that further conduction thereof is prohibited. It follows that further conduction of rectifier SCR20 is prohibited and, thus, the control relay CR20 is rendered inoperative, i.e., is deenergized.

Accordingly, it may be seen that a control system is provided wherein the operation of a responsive device may be accurately controlled during each cycle of operation of a press or the like. The period of operation of the responsive device is determined by the presettings of reference potentiometer P21 and resistor R23 which are preset so that transistor TR20 is rendered conductive before transistor TR21.

Though this embodiment of the invention has been set forth with only a single responsive device being controlled thereby, it is to be understood that a plurality of responsive devices may be controlled thereby and the invention is intended to cover such an expansion of this embodiment. In the event it is desirable to control the operation of a plurality of responsive devices, an equal plurality of reference potentiometers corresponding to the reference potentiometer P21 and the related circuitry will be associated with the control potentiometer P20.

It is contemplated that the invention may be utilized in areas wherein the temperature may vary over a substantial range. For this reason, temperature compensating means may be provided as illustrated in FIG. 8. Referring thereto, a temperature compensating network consisting of thermistors TH20 and TH21, a sensistor SE20, and a capacitor C23 is connected in the gate electrode circuit of rectifier SCR20. Additionally, a temperature compensating network including a thermistor TH22 and a resistor R28 are connected in series with resistor R23 between the base and the emitter of transistor TR21.

For the purpose of offsetting the indicating dial settings of the reference potentiometer with respect to the contact arm positions of the control potentiometer so that the indicating dial positions correspond with the angles in each cycle at which the desired outputs are provided rather than at the angles at which "null" outputs are provided, compensating, variable resistors R25 and R26 are provided in the bridge network B20.

In accordance with still another aspect of the present invention, means may be provided for negating the effect of the transistor TR21 so that the deenergizing of the responsive device, once energized, is controlled by another remote device. More specifically, a limit switch or a time operating switch may be utilized for controlling the period of operation of the responsive device beyond the time determined by the transistor 21.

Referring to FIG. 8, a remotely controlled switch LS20, such as a limit switch or a time operated switch, and a normally open contact CR20–1 of the control relay are connected in series across the anode-cathode circuit of the rectifier SCR20. It follows then that, when the control relay is energized, the normally open contact CR20–1 is closed so that the anode-cathode circuit of the rectifier SCR20 is bypassed. Accordingly, when the transistor TR21 is rendered conductive so that the rectifier SCR20 is rendered inoperative, the control relay is not effected thereby and remains energized. Subsequently, when the limit switch or time operated switch LS20 is opened, the control relay CR20 will be deenergized.

Thus, it may be seen that means have been provided for causing the responsive device to be energized at a prescribed time during each cycle of operation of the press and to remain energized for a time period determined by the operation of another remote device such as a limit switch or a time operated switch.

In view of the foregoing, it may be seen that a system has been provided for controlling the period of operation of at least one responsive device during each cycle of operation of a press or the like, the system having been found to be utilizable with motor speeds in excess of 30 r.p.m. In the claims, the term "press or the like" has been set forth. However, the invention is not intended to be limited to use with presses, but rather is intended to cover any controlling operation wherein it is desirable to regulate the period of operation of one or more responsive devices during each cycle of operation.

I claim as my invention:

1. In a system for providing mutually independent control over the periods of operation of a plurality of responsive devices during each cycle of operation of a press or the like, the combination which comprises, first and second means for providing a plurality of output voltage signals, each signal swept from a value of one polarity at one instant during each cycle of the operation; to a value of the other polarity at another instant during each cycle of operation and passing predetermined values and polarities at preset times between said instants, a plurality of pairs of control means having threshold characteristics responsive respectively to said predetermined values, each pair for controlling a different one of said responsive devices, one of each pair responsive to the passage of a prescribed value by a selected output voltage signal provided by the first means for rendering the responsive device associated with the pair operative when the signal has a prescribed polarity and value, and the other of each pair responsive to the passage of a prescribed value by a selected output voltage signal provided by the second means and independent of the concurrent value of the voltage signal produced by said first means for rendering the responsive device associated with the pair inoperative when the signal has a prescribed polarity and amplitude.

2. In a system for controlling the period of operation of a responsive device during each cycle of operation of a press or the like, the combination which comprises, means responsive to the operation of the press or the like for providing a pair of cyclically recurring output voltage signals having prescribed polarities and amplitudes at preset times, each swept through a range of values at preset times during each cycle of operation of the press or the like, control means for rendering the responsive device operative when operatively associated therewith, a first switch device connected to receive one of said signals for operatively associating the control means with the responsive device in response to said one signal passing a predetermined value within its range of values, and a second switch device connected to receive the other of said signals for operatively disassociating the control means from the responsive device in response to said other signal passing a predetermined value within its range of values and independently of the concurrent value of said one signal.

3. In a system for controlling the period of operation of a responsive device during each cycle of operation of a press or the like, the combination which comprises, first and second signal generating means run in synchronism with and responsive to the operation of the press or the like for providing a pair of cyclically recurring output voltage signals each having prescribed polarities and amplitudes at preset times during each cycle of operation of said press or the like, control means for rendering the responsive device operative when operatively associated therewith, a first switch device responsive to the passage of a predetermined value by the output signal provided by the first means for operatively associating the control means with the responsive device at a given instant in each cycle of operation of the press or the like, a second switch device responsive to the passage of a predetermined value by the output signal provided by the second means for operatively disassociating the control means from the responsive device at another instant in each cycle of operation of the press or the like, independently of the concurrent value of said one signal, and means associated with said first and second signal generating means for adjustably varying the instants during the cycle of operation of said press or the like when said signals pass their predetermined, switch-triggering values.

4. In a system for controlling the period of operation of a responsive device during each cycle of operation of a press or the like, the combination which comprises, means including a bridge network which has an input and an output and which includes an adjustable reference potentiometer and a control potentiometer for providing an output voltage signal having a prescribed polarity and amplitude at a preset time during each cycle of operation, a voltage source associated with the bridge circuit input, control means responsive to the prescribed output signal for rendering the responsive device operative, a voltage divider including a second adjustable reference potentiometer connected across the output of the bridge network, and control means responsive to a voltage having a prescribed polarity and amplitude being produced across the second reference potentiometer for rendering the responsive device inoperative.

5. In a system for controlling the period of operation of a responsive device during each cycle of operation of a press or the like, the combination which comprises, means including first and second bridge circuits each having an input and an output and each including an adjustable reference potentioometer and a control potentiometer for providing output voltage signals at the outputs thereof having prescribed polarities and amplitudes at preset times during each cycle of operation, a voltage source associated with the bridge circuit inputs, control means responsive to the prescribed output signal being provided at the output of the first bridge circuit for rendering the responsive device operative, and control means responsive to the prescribed output signal being provided at the output of the second bridge circuit for rendering the responsive device inoperative.

6. In a system for controlling the period of operation of a responsive device during each cycle of operation of a press or the like, the combination which comprises, means including first and second bridge circuits each having an input and an output and each including an adjustable reference potentiometer and a control potentiometer for providing output voltage signals at the outputs thereof having prescribed polarities and amplitudes at preset times during each cycle of operation, a voltage source associated with the bridge circuit inputs, control means for rendering the responsive device operative when operatively associated therewith, means responsive to the prescribed output signal being provided at the output of the first bridge circuit for operatively associating the control means with the responsive device, and means responsive to the prescribed output signal being provided at the output of the second bridge circuit for operatively disassociating the control means from the responsive device.

7. In a system for controlling the period of operation of at least one responsive device during each cycle of operation of a press or the like, the combination which comprises, means including a bridge network which has an input and at least a pair of outputs and which includes at least two adjustable reference potentiometers and a control potentiometer for providing output voltage signals at the outputs thereof having prescribed polarities and amplitudes at preset times during each cycle of operation, a voltage source associated with the bridge network input, control means associated with one output in each pair and responsive to the prescribed output signal being provided thereat for rendering an associated responsive device operative, and control means associated with the other output in each pair and responsive to the prescribed output signal being provided thereat for rendering the associated responsive device inoperative.

8. In a system for controlling the period of operation of a responsive device during each cycle of operation of a press or the like, the combination which comprises, means including a bridge network having an input and an output and which includes an adjustable reference potentiometer and a control potentiometer for providing an output voltage signal which is swept from one value to a second value during each cycle of operation, a voltage source associated with the bridge network input, first control means associated with the bridge network output and responsive to an output signal having a prescribed voltage level for rendering the responsive device operative, and second control means associated with the bridge network output and responsive to an output signal having a different prescribed voltage level for rendering the responsive device inoperative.

9. In a system for controlling the period of operation of a responsive device during each cycle of operation of a press or the like, the combination which comprises, means including a bridge network having an input and an output and which includes an adjustable reference potentiometer and a control potentiometer for providing an output voltage signal which is swept from one value to a second value during each cycle of operation, a voltage source associated with the bridge network input, first control means including a transistor associated with the bridge network output and responsive to an output signal having a precribed voltage level for rendering the responsive device operative, and second control means including a transistor associated with the bridge network output and responsive to an output signal having a different prescribed voltage level for rendering the responsive device inoperative.

10. In a system for controlling the period of operation of at least one responsive device during each cycle of operation of a press or the like, the combination which comprises, means including first and second bridge networks each having an input and at least one output so as to provide a pair of bridge network outputs, one from each network, for controlling each responsive device and each network including at least one adjustable reference potentiometer and a control potentiometer for providing output voltage signals at the outputs thereof having prescribed polarities and amplitudes at preset times during each cycle of operation, a voltage source associated with the bridge circuit inputs, a pair of control means associated with each said pair of bridge network outputs, one of each pair of control means responsive to a prescribed output signal being provided at one of said pair of bridge circuit outputs for rendering the responsive device controlled by said pair operative, and the other of each pair of control means responsive to a prescribed output signal being provided at the other of said pair of bridge circuit outputs for rendering the responsive device controlled by said pair inoperative.

11. In a system for controlling the period of operation of a responsive device during each cycle of operation of a press or the like, the combination which comprises, first and second bridge circuits each having an input and an output and each including an adjustable reference potentiometer and a control potentiometer for providing output voltage signals at the outputs thereof, means responsive to operation of the press for causing the bridge circuit outputs to be swept from values of one polarity to values of the other polarity at preset times during each cycle of operation, a voltage source associated with the bridge circuit inputs, control means for rendering the responsive device operative when operatively associated therewith, means including a static-latching switch responsive to a prescribed polarity and amplitude output signal being provided at the output of the first bridge circuit for operatively associating the control means with the responsive device, and means including a static-latching switch responsive to a prescribed polarity and amplitude output signal being provided at the output of the second bridge circuit for operatively disassociating the control means from the responsive device.

12. In a system for controlling the period of operation of a responsive device during each cycle of operation of a press or the like, the combination which comprises, means including first and second means for providing output voltage signals which are swept from values of one polarity to values of the other polarity at preset times during each cycle of operation, control means for rendering the responsive device operative when operatively associated therewith, a first switch device responsive to a prescribed polarity and amplitude output signal provided by the first means for operatively associating the control means with the responsive device, a second switch device responsive to a prescribed polarity and amplitude output signal provided by the second means for operatively disassociating the control means from the responsive device, and means operable to reverse the effect of the switch devices so that the first switch device is responsive to the output of the second means and the second switch device is responsive to the output of the first means.

13. In a system for controlling the period of operation of a responsive device during each cycle of operation of a press or the like, the combination which comprises, first and second bridge circuits each having an input and an output and including an adjustable reference potentiometer and a control potentiometer for providing output voltage signals at the outputs thereof, means responsive to operation of the press for causing the bridge circuit outputs to be swept from values of one polarity to values of the other polarity at preset times during each cycle of operation, a voltage source connected to the inputs of the bridge circuits, adjustable means in each bridge circuit for compensating for variations in resistive tolerances of the associated potentiometers, control means for rendering the responsive device operative when operatively associated therewith, means responsive to a prescribed polarity and amplitude output signal being provided at the output of the first bridge circuit for operatively associating the control means with the responsive device, and means responsive to a prescribed polarity and amplitude output signal being provided at the output of the second bridge circuit for operatively disassociating the control means from the responsive device.

14. In a system for controlling the period of operation of at least one responsive device during each cycle of operation of a press or the like, the combination which comprises, first and second bridge networks each having an input and at least one output and including at least one adjustable reference potentiometer and a control potentiometer for providing output voltage signals at the outputs thereof, means responsive to operation of the press for causing the bridge circuit outputs to be swept from values of one polarity to values of the other polarity at preset times during each cycle of operation, a voltage source connected to the inputs of the bridge circuits, control means for rendering responsive devices operative when operatively associated therewith, at least one silicon controlled rectifier for operatively associating the control means with an associated responsive device when rendered conductive, at least one silicon controlled rectifier for operatively disassociating the control means from an associated responsive device when rendered conductive, means including a transistor associated with each output of the first bridge circuit and with a silicon controlled rectifier and being rendered operative to cause the associated silicon controlled rectifier to be rendered conductive when a prescribed polarity and amplitude output signal is provided at the associated output of the first bridge circuit, and means including a transistor associated with each output of the second bridge circuit and with a silicon controlled rectifier and being rendered operative to cause the associated silicon controlled rectifier to be rendered conductive when a prescribed polarity and amplitude output signal is provided at the associated output of the second bridge circuit.

15. In a system for controlling the period of operation of a responsive device during each cycle of operation of a press or the like, the combination which comprises, first and second bridge circuits each having an input and an output and including an adjustable reference potentiometer and a control potentiometer for providing output voltage signals at the outputs thereof, means responsive to operation of the press for causing the bridge circuit outputs to be swept from values of one polarity to values of the other polarity at preset times during each cycle of operation, a pair of voltage sources each being connected to the input of one of the bridge circuits, control means for rendering the responsive device operative when operatively associated therewith, a first silicon controlled rectifier for operatively associating the control means with the responsive device when rendered conductive, a second silicon controlled rectifier for operatively disassociating the control means from the responsive device when rendered conductive, a first transistor associated with the output of the first bridge circuit and transformer coupled to the first silicon controlled rectifier, the first transistor rendered conductive to render the first silicon controlled rectifier conductive when a prescribed polarity and amplitude output signal is provided at the output of the first bridge circuit, and a second transistor connected to the output of the second bridge circuit and connected to the second silicon controlled rectifier being rendered conductive to cause the second silicon controlled rectifier to be rendered conductive when a prescribed polarity and amplitude output signal is provided at the output of the second bridge circuit.

16. In a system for controlling the period of operation of a responsive device during each cycle of operation of a press or the like, the combination which comprises, first and second bridge circuits each having an input and an output and including an adjustable reference potentiometer and a control potentiometer, each potentiometer having a circular winding and a rotatable slider arm which engages the winding to divide the winding into two portions that act as legs of the associated bridge circuit, means for causing the slider arms of the control potentiometers to be rotated together one complete revolution for each cycle of operation of the press, a pair of voltage sources each being connected to the input of one of the bridge circuits, the output of the bridge circuits being provided between the slider arms of the included potentiometers, the slider arms on the adjustable reference potentiometers being so preset that the outputs of the bridge circuits are swept at preset times from values of one polarity to values of the other polarity during each revolution of the sliders of the control potentiometers, control means for rendering the responsive device operative when operatively associated therewith, means responsive to a prescribed polarity and amplitude output signal being provided at the output of the first bridge circuit for operatively associating the control means with the responsive device, and means responsive to a prescribed polarity and amplitude output signal being provided at the output of the second bridge cricuit for operatively disassociating the control means from the responsive device.

17. In a system for controlling the period of operation of a responsive device during each cycle of operation of a press or the like, the combination which comprises, means including a bridge network for providing an output voltage signal which is swept from one value to a second value during each cycle of operation, first control means associated with the bridge network output and responsive to an output signal having a prescribed voltage level for rendering the responsive device operative, and second control means associated with the bridge network output and responsive to an output signal having a different prescribed voltage level for rendering the responsive device inoperative.

References Cited by the Examiner

UNITED STATES PATENTS

| | | | |
|---|---|---|---|
| 2,845,534 | 7/1958 | Hoeppner | 317—149 |
| 3,028,531 | 4/1962 | Heiberger | 318—20.780 |
| 3,051,873 | 8/1962 | Jensen | 317—148.5 |
| 3,098,949 | 7/1963 | Goldberg | 307—88.5 |
| 3,103,597 | 9/1963 | Novick | 307—88.5 |

DAVID J. GALVIN, *Primary Examiner.*